No. 634,775. Patented Oct. 10, 1899.
C. T. SUDERMAN & G. W. LACY.
GRAIN TRIMMING MACHINE USED IN LOADING VESSELS.
(Application filed May 2, 1899.)
(No Model.)
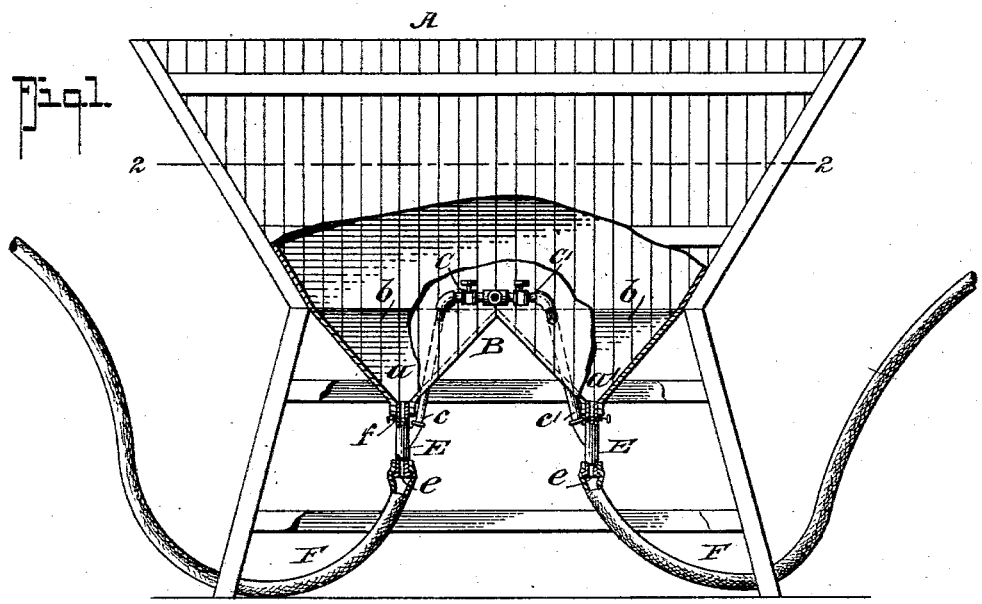
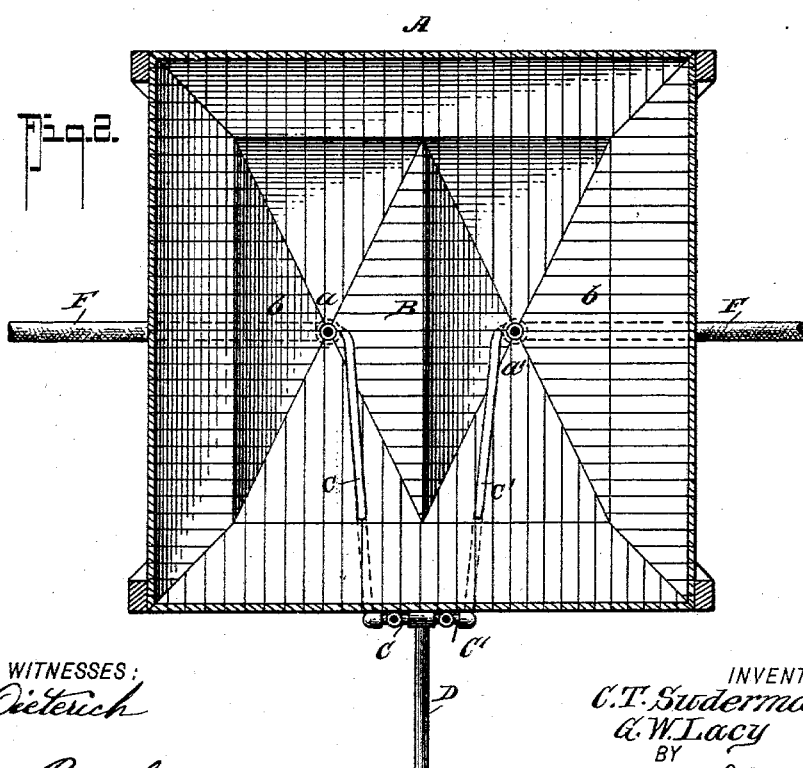
WITNESSES:
H. S. Dieterich
Vivian Bradford
INVENTORS
C. T. Suderman
G. W. Lacy
BY
Fred G. Dieterich & Co.
ATTORNEYS
THE NORRIS PETERS CO., PHOTO-LITHO., WASHINGTON, D. C.

UNITED STATES PATENT OFFICE.

CHARLES T. SUDERMAN AND GEORGE W. LACY, OF GALVESTON, TEXAS.

GRAIN-TRIMMING MACHINE USED IN LOADING VESSELS.

SPECIFICATION forming part of Letters Patent No. 634,775, dated October 10, 1899.

Application filed May 2, 1899. Serial No. 715,390. (No model.)

*To all whom it may concern:*

Be it known that we, CHARLES T. SUDERMAN and GEORGE W. LACY, residing at Galveston, in the county of Galveston and State of Texas, have invented new and useful Improvements in Grain-Trimming Apparatus, of which the following is a specification.

This invention is in the nature of an improved means for facilitating the loading of cargoes of grain onto vessels.

In the usual method of loading grain onto vessels it is customary to provide spouts for loading the grain from the elevator to the vessel and to employ manual labor for distributing the grain to the hold of the vessel, so as to leave no open places between the decks and also to give the vessel a full cargo as well as distribute the cargo over those parts of the hold farthest from the place where the grain is discharged to the vessel, thereby keeping the vessel from shifting and also adding safety as well as utilizing the fullest capacity of the vessel by reason of filling all of the vacant places in the hold thereof. This method of loading vessels is costly, requires considerable time, and does not always satisfactorily distribute the grain. Our invention seeks to provide a simple but effective means whereby the grain can be properly trimmed within the vessel's hold and by which the loading can be effected in a much less time than can be possibly accomplished by the use of laborers and shovels and by which the grain can be readily deflected to any part of the vessel's hold and uniformly distributed over all the parts thereof.

With the aforesaid objects in view our invention comprehends a receiving-hopper having discharging-apertures in the bottom thereof, discharge-tubes connected with such discharge-apertures, and pneumatic means for forcing the grain into and through the discharge-tubes at such point or points desired.

Our invention also comprehends certain details and combination of parts, such as will be first described and then be specifically pointed out in the appended claims, reference being had to the accompanying drawings, in which—

Figure 1 is a side elevation, partly in section, of our improved grain-trimming machine. Fig. 2 is a top plan view thereof.

In the practical construction of our invention the same comprehends a hopper A of suitable size, which is adapted to be conveniently placed upon the vessel or other point to receive the grain from the elevator, and the said hopper may have a single discharge in the bottom, but preferably has two discharges (indicated by $a\ a'$) at the bottom of the convergingly-disposed collecting-pockets $b\ b$, that are divided by the central pyramidal partition B, and the said discharges $a\ a'$ communicate with the pendent boot E E, the lower ends of which have necks $e$ for the convenient passing thereto of flexible hose-sections F. To regulate the flow of the grain, the said boots E have cut-off slides $f f$, as shown.

D indicates a feed-pipe in which air is forced under pressure from any suitable point, and the said pipe has a pair of valved laterals C C', which terminate in discharging-nozzles $c\ c'$, that merge with or discharge into the boots E in the direction of their discharge end and at a point below the slides $f f$.

It will be noticed by reference to Fig. 2 that the feed-pipe D is disposed outside the bin or trough, whereby to place its valved laterals in position to be easily manipulated, the air-ejecting pipes being extended horizontally into the trough or bin to a point midway thereof and then projected through the bottom of the bin to discharge downward into the boots E. By thus arranging the air feed and ejecting pipes the pneumatic suction through the boots E can be regulated at will and one part of the bin or trough made to discharge faster into one pipe F than into the other, as conditions may make desirable.

From the foregoing, taken in connection with the drawings, it will be readily apparent that the grain may be conveyed from the collecting-trough by pneumatic pressure into the ship's hold at different parts simultaneously, or, when desired, to two or more ships at the same time, the active agency in this invention being conveying the grain by the application of air-pressure in connection with the pipes and hose to throw the grain.

One of the essential advantages of our invention is that the grain can be distributed over any part of the vessel that can be reached by spouts and shovels, as well as to such parts thereof that cannot be practically filled by the ordinary methods of loading.

Having thus described our invention, what we claim, and desire to secure by Letters Patent, is—

1. A collecting-trough having a converging bottom terminating in a plurality of separate discharges; a pendent boot member secured to each discharge; a cut-off valve in each boot; a feed-pipe adapted to receive the air under pressure, said pipe being located outside the bin and having valved laterals terminating in downward extensions discharging into the boots at a point below the cut-off valves therein.

2. An apparatus for the purposes described, comprising a bin having converging sides whereby a contracted bottom is formed; a transverse pyramidal partition B, separating the said bottom into two collecting-compartments, a discharge-boot projected from the bottom of each compartment, said boots having cut-off valves; a feed-pipe adapted to convey air under pressure, said pipe having valved laterals adjacent the outer side of the bin, said laterals extending into the bin and terminating at points in line with the discharge-orifices of the collecting-space and then projected down through the bottom of the bin and communicating with the boots at a point below the valve thereof, and a flexible offtake-pipe F, connected with each boot, all being arranged substantially as shown and described.

CHAS. T. SUDERMAN.
GEO. W. LACY.

Witnesses:
JAS. B. STUBBS,
FRED J. BURKEY.